United States Patent
Rapaport

(10) Patent No.: US 12,524,225 B1
(45) Date of Patent: Jan. 13, 2026

(54) SYSTEM, METHOD, AND COMPUTER PROGRAM FOR SOFTWARE CUSTOMIZATION

(71) Applicant: Amdocs Development Limited, Limassol (CY)

(72) Inventor: Roman Rapaport, Ofakim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 428 days.

(21) Appl. No.: 18/099,198

(22) Filed: Jan. 19, 2023

(51) Int. Cl.
  *G06F 8/41* (2018.01)
  *G06F 8/30* (2018.01)
  *G06F 8/71* (2018.01)

(52) U.S. Cl.
  CPC ............. *G06F 8/71* (2013.01); *G06F 8/30* (2013.01); *G06F 8/41* (2013.01)

(58) Field of Classification Search
  CPC .............. G06F 8/30; G06F 8/71; G06F 8/41
  See application file for complete search history.

(56) References Cited

U.S. PATENT DOCUMENTS

| | | | | |
|---|---|---|---|---|
| 8,589,909 B2 * | 11/2013 | Hu | .......... | G06F 8/656 717/172 |
| 11,960,861 B1 * | 4/2024 | Pangam | .......... | G06F 8/30 |
| 2010/0257515 A1 * | 10/2010 | Bates | .......... | G06F 8/656 717/145 |
| 2011/0119651 A1 * | 5/2011 | Utschig-Utschig | ....... | G06F 8/71 717/126 |
| 2018/0293069 A1 * | 10/2018 | Narayanan | .......... | G06F 8/36 |
| 2024/0111949 A1 * | 4/2024 | Frantz | .......... | G06F 40/194 |

* cited by examiner

*Primary Examiner* — Marina Lee
(74) *Attorney, Agent, or Firm* — Zilka-Kotab, P.C.

(57) ABSTRACT

As described herein, a system, method, and computer program are provided for code customization. A customization of existing code or metadata defining a software application is received, to form a customized version of the software application. The customization is tagged with a label that differentiates the customization from the existing code or metadata. During runtime or compilation time, a conditional logical selection between the existing code or metadata and the customization is made, using the label.

14 Claims, 5 Drawing Sheets

FIG. 2

SYSTEM, METHOD, AND COMPUTER PROGRAM FOR SOFTWARE CUSTOMIZATION

FIELD OF THE INVENTION

The present invention relates to customizing software at a code or metadata level.

BACKGROUND

When the base code of a software application, or metadata corresponding to the base code, has been customized to form a customized version of the software application (i.e. customized code), any subsequent base code changes might be conflicting with the customized code. Resolving the conflicts might be a very complex task as it will require an analysis of every change that happened in both the customized code and the base code over the entire development cycle, just to understand the requirements which led to making the change. Resolving the conflicts might also include deciding if and how to adopt the newly introduced base code in order to comply with the customization requirements and not cause code breaks. Ultimately, the same considerations also apply for an additional customization of a customized code, which might actually involve an even worst conflicts to handle. Furthermore, the customization of metadata (or lowcode) might be augmenting the problem since it is mostly not readable for humans, making it even more complex to understand the changes.

In addition, when customizing base code or metadata, there are some scenarios in which the base code/metadata and resulting customized code/metadata is to be delivered under different writing standards (e.g. policies or constraints). However, with standard customization techniques, the code/metadata will be merged into the same place from both the base and the customization, which will make it impossible to deliver the two different standards of code for the same merged chunk of code.

There is thus a need for addressing these and/or other issues associated with the prior art. For example, there is a need to be able to make a customization of existing code while avoiding the adoption of conflicts with the existing code and/or to allow for a customization of existing code that complies with a different standard than the standard used for the existing code.

SUMMARY

As described herein, a system, method, and computer program are provided for code customization. A customization of existing code or metadata defining a software application is received, to form a customized version of the software application. The customization is tagged with a label that differentiates the customization from the existing code or metadata. During runtime or compilation time, a conditional logical selection between the existing code or metadata and the customization is made, using the label.

BRIEF DESCRIPTION OF THE DRAWINGS

FIG. 2 illustrates a block diagram of a code customization process, in accordance with one embodiment.

DETAILED DESCRIPTION

Figure 1:
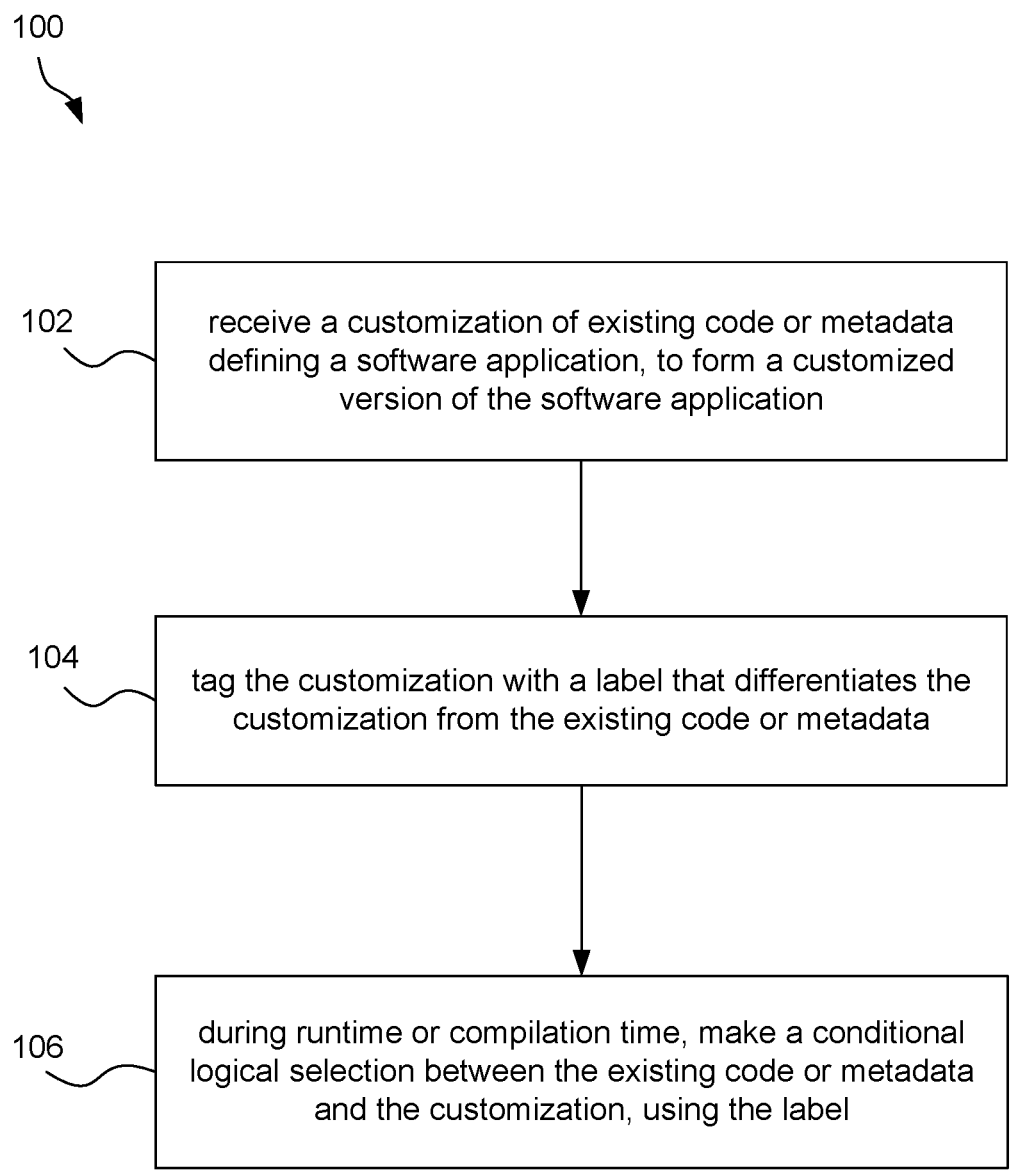
FIG. 1 illustrates a method for software customization, in accordance with one embodiment.

FIG. 1 illustrates a method 100 for software customization, in accordance with one embodiment. The method 100 may be performed by any computer system described below with respect to FIGS. 4 and/or 5.

In operation 102, a customization of existing code or metadata defining a software application is received, to form a customized version of the software application. The software application refers to any package of code or metadata defining executable functionality. The customization refers to any change to the existing code or metadata which forms the customized version of the software application. With respect to the present embodiment, the customization is created without modifying the existing instance of the code or metadata.

In an embodiment, the customization is of the existing code. In this embodiment, the customization may be received as new code. The existing code may be base code for the software application. The base code refers to an initially developed version of the software application. The existing code may be an existing customization of the software application, which was made to any prior developed version of the software application, such as the base code.

In another embodiment the customization is of the existing metadata. In this embodiment, the customization may be received as new metadata. The metadata refers to data that is a description of the software application, which for example can be made using a graphical user interface editor. The existing metadata may be base metadata for the software application (i.e. an initially developed version of the software application). The existing metadata may be an existing customization of the software application, which was made to any prior developed version of the software application, such as the base metadata.

In operation 104, the customization is tagged with a label that differentiates the customization from the existing code or metadata. The label may be any identifier that differentiates the customization from the existing code or metadata from which the customization was created. For example, the label may indicate that the customization defines a particular (customized) version of the software application.

In an embodiment, the customization may be automatically tagged with the label, such as where a user has created the customization while working on the customized version of the software application. In another embodiment, the user may tag the customization with the label during development of the customization.

In an embodiment, the existing code or metadata may also be tagged with a second label that is different from the label for the customization. The second label may identify a version of the software application corresponding to the existing code or metadata (e.g. a base version of the software application). On the other hand, the label for the customization may identify the customized version of the software application.

In operation 106, during runtime or compilation time, a conditional logical selection between the existing code or metadata and the customization is made, using the label. For example, when executing or compiling the customized version of the software application, the label may be used to identify and select the customization for execution of compilation (i.e. as opposed to selecting the existing code or metadata for execution of compilation). In an embodiment, the conditional logical selection between the existing code or metadata and the customization may be made during runtime of the software application, to select whether to execute the existing code or metadata, or the customization. In another embodiment, the conditional logical selection between the existing code or metadata and the customization may be made during compilation time for the software application, to select whether to compile the existing code or metadata, or the customization.

With respect to the embodiment described above where the existing code or metadata is tagged with the second label, then the conditional logical selection between the existing code or metadata and the customization may be further made using the second label for the existing code or metadata. For example, when executing or compiling the version of the software application corresponding to the existing code or metadata, then the second label may be used to identify and select the existing code or metadata for execution or compilation. Alternately, when executing or compiling the customized version of the software application, then the label for the customization may be used to identify and select the customization for execution or compilation.

To this end, the method 100 may be performed to allow for a customization of existing code while avoiding the adoption of conflicts by changing an existing instance of the code. Further, when the customization conflicts with a second existing code or metadata defining the software application, then the conditional logical selection may include selecting the existing code or metadata.

As an optional embodiment, the existing code or metadata may be configured according to a first standard (e.g. policy or constraint) and the customization may be configured according to a second standard different from the first standard. Just by way of example, the second standard applied to the customization may include the constraint that a customized line length cannot be longer than 50 and cannot have spaces between operators, whereas the first standard applied to the existing code or metadata may include the constraint that a line length cannot be longer than 100 that spaces between operators are required. In this embodiment, a verification of the software application in accordance with the second standard may be performed using the label. For example, only the customization having the label will be verified according to the second standard.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
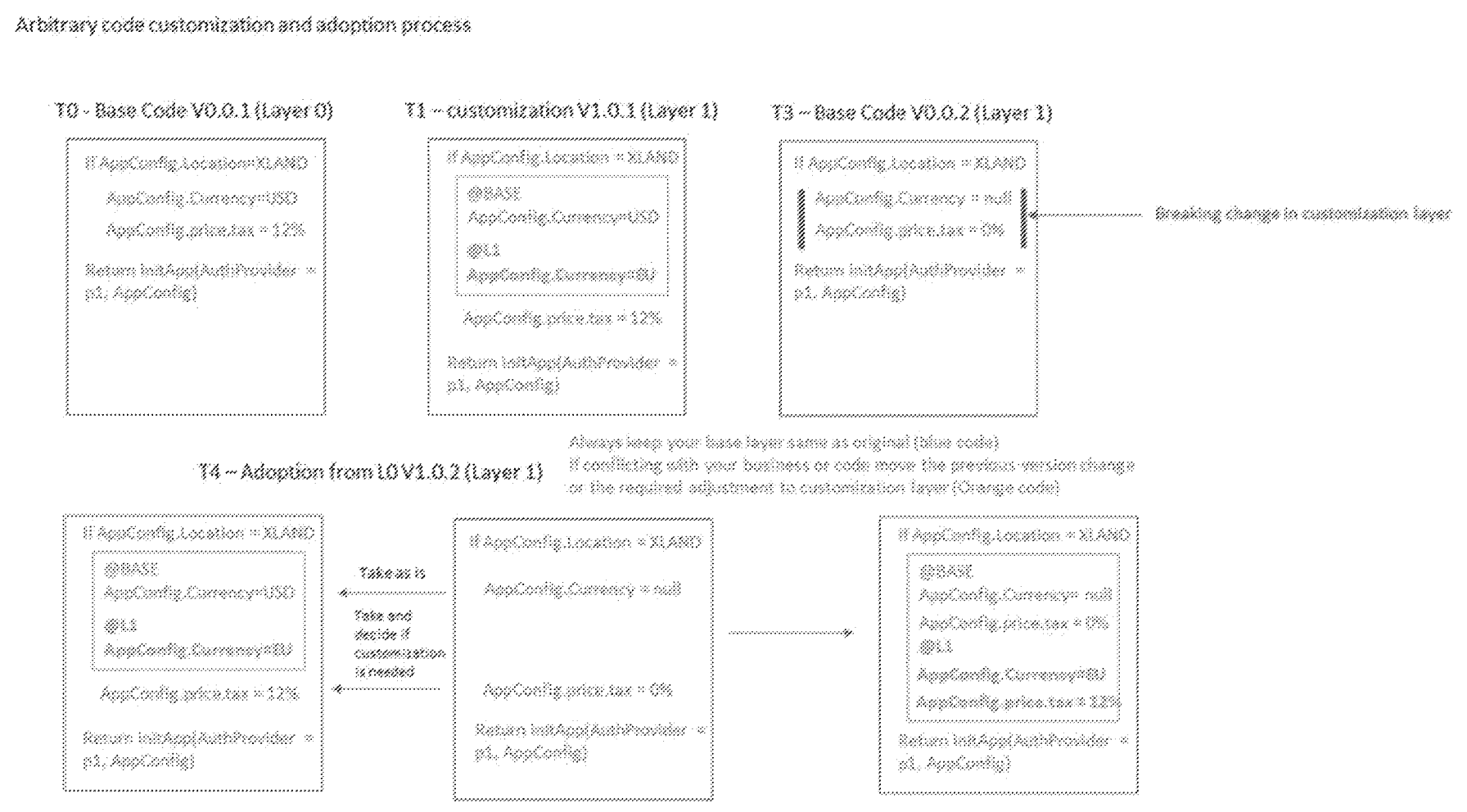

FIG. 2 illustrates a block diagram of a code customization process, in accordance with one embodiment. As an option, the code customization process may be carried out in the context of the details of the previous figure and/or any subsequent figure(s). Of course, however, the code customization process may be carried out in the context of any desired environment. Further, the aforementioned definitions may equally apply to the description below.

The present code customization process illustrates how, in code, labels can be used to indicate which code portions belong to which software version.

1) Base code or metadata is selected separately and remains as-is (cannot be changed in place). This eliminates code/metadata mixtures between base and customization layers.

2) Customized code or metadata (i.e. the customization) will be tagged to separate it from the existing base code from which the customization is created. The customization can be tagged using a logical name. For: "layer2" or "custom_code" for customization and "base_code" for the respective base code. In the specific example shown in FIG. 2, the base code is tagged with @BASE and the customization is tagged with @L1.

3) In runtime or compile time, a conditional logical selection is made between the base code or the customization. Based on the application configuration, it will be determined which code to run from the base version and which code from the tagged customization parts. For example, if the customization code part logical name is "layer2", then the layer2 version of the application will be able to be shown or executed by showing or executing selected code in "layer2" and skipping the changed existing code marked as "base_code".

4) For each code adoption the base code will be adopted as-is to its respective clause in the code. For example: in "base_code" clause, when conflicts arise the system will decide whether to adopt the change or ignore it in the customization clause only. This will provide immediate visibility on the change coming from the base code without the need to track its entire history to resolve the conflict. In same manner, when the change is not in the "base_code" clause, it will create immediate visibility and understanding that the change is to be ignored and that no action should be taken (just adopt as-is).

Figure 3:
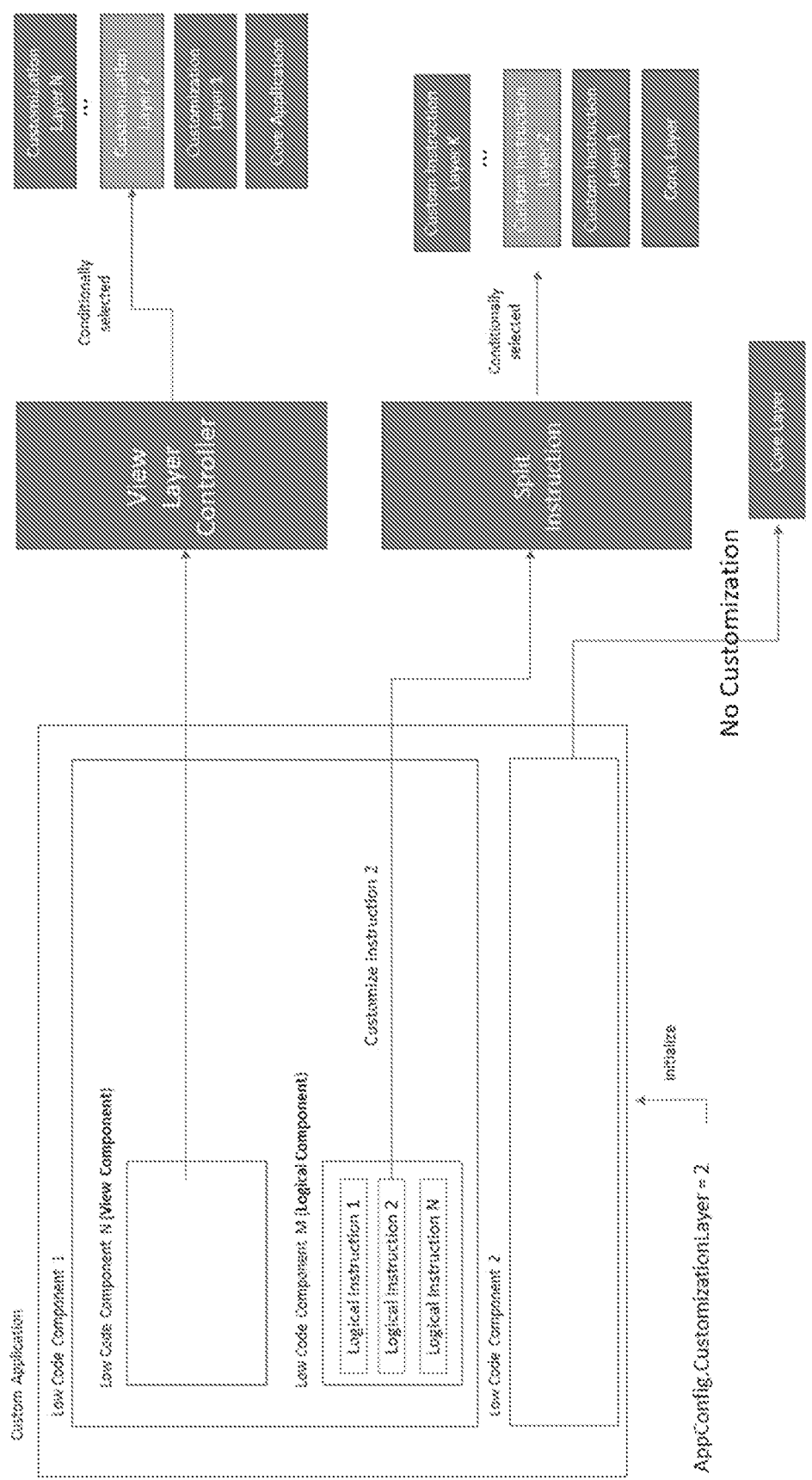
FIG. 3 illustrates a block diagram of a metadata customization process, in accordance with one embodiment.

FIG. 3 illustrates a block diagram of a metadata customization process, in accordance with one embodiment. As an option, the metadata customization process may be carried out in the context of the details of the previous figure and/or any subsequent figure(s). Of course, however, the metadata customization process may be carried out in the context of any desired environment. Further, the aforementioned definitions may equally apply to the description below.

The present metadata customization process illustrates how, in metadata, we can use labels to indicate which metadata portions belong to which software version.

In a low code platform with metadata which are managed and operated with graphical user interface (GUI) editors, configuration options, components or controllers may be directly provided to make the logical selection.

In the present embodiment, the "view" refers to elements which are seen on the screen such as cards, buttons lists, etc. A view can encapsulate more views inside itself.

In the present embodiment, the "logical instruction" is business logic and behaviors such as calculations, navigations, API calls, etc.

In FIG. 3, we customize view N to show a different view when browsing in the app, using active customization layer equals to 2. We switch one instruction ("Logical Instruction 1") in component M with a different instruction ("Logical Instruction 2") to alternate the logic to be different for the layer that equals to 2.

Figure 4:
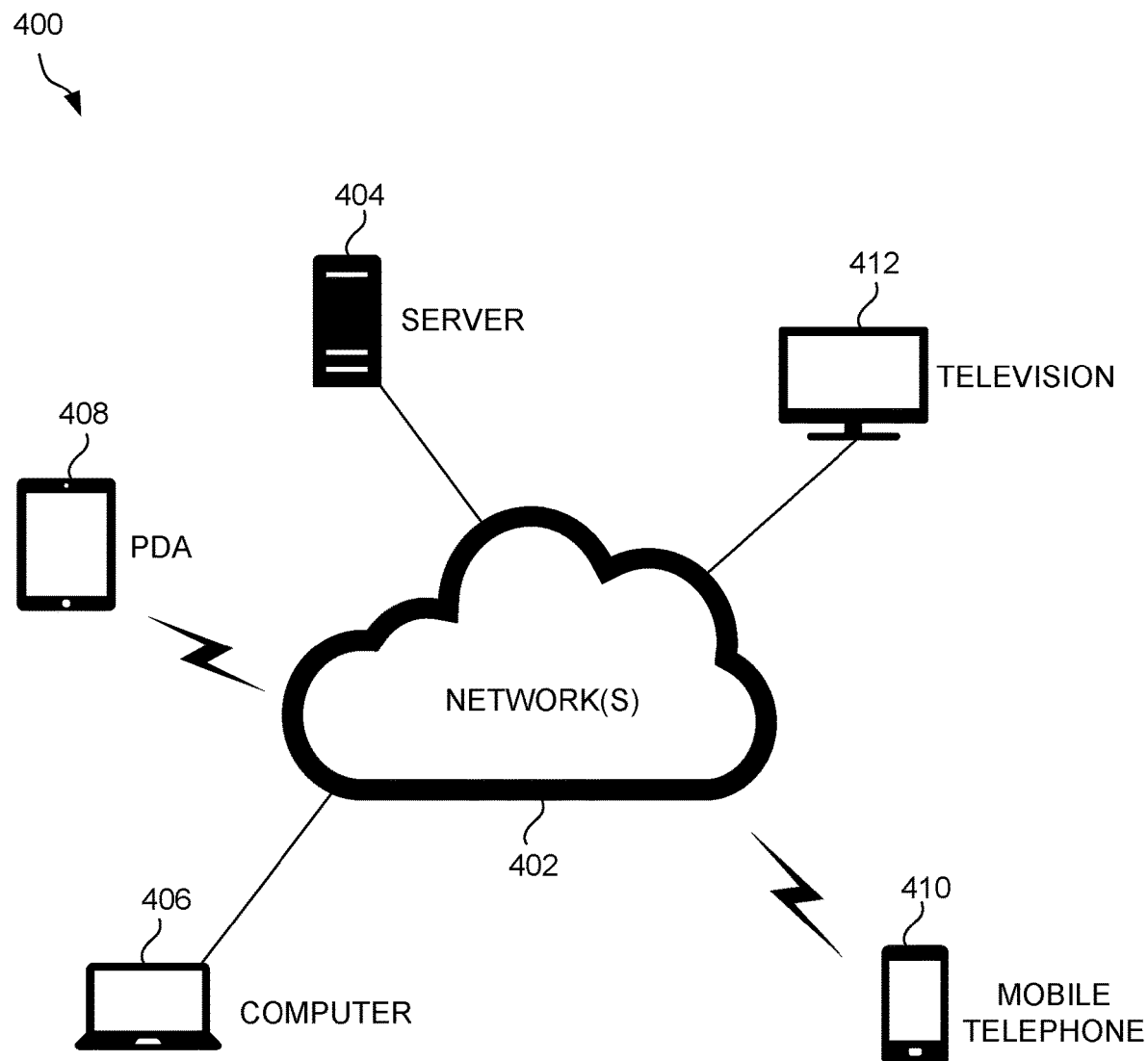
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
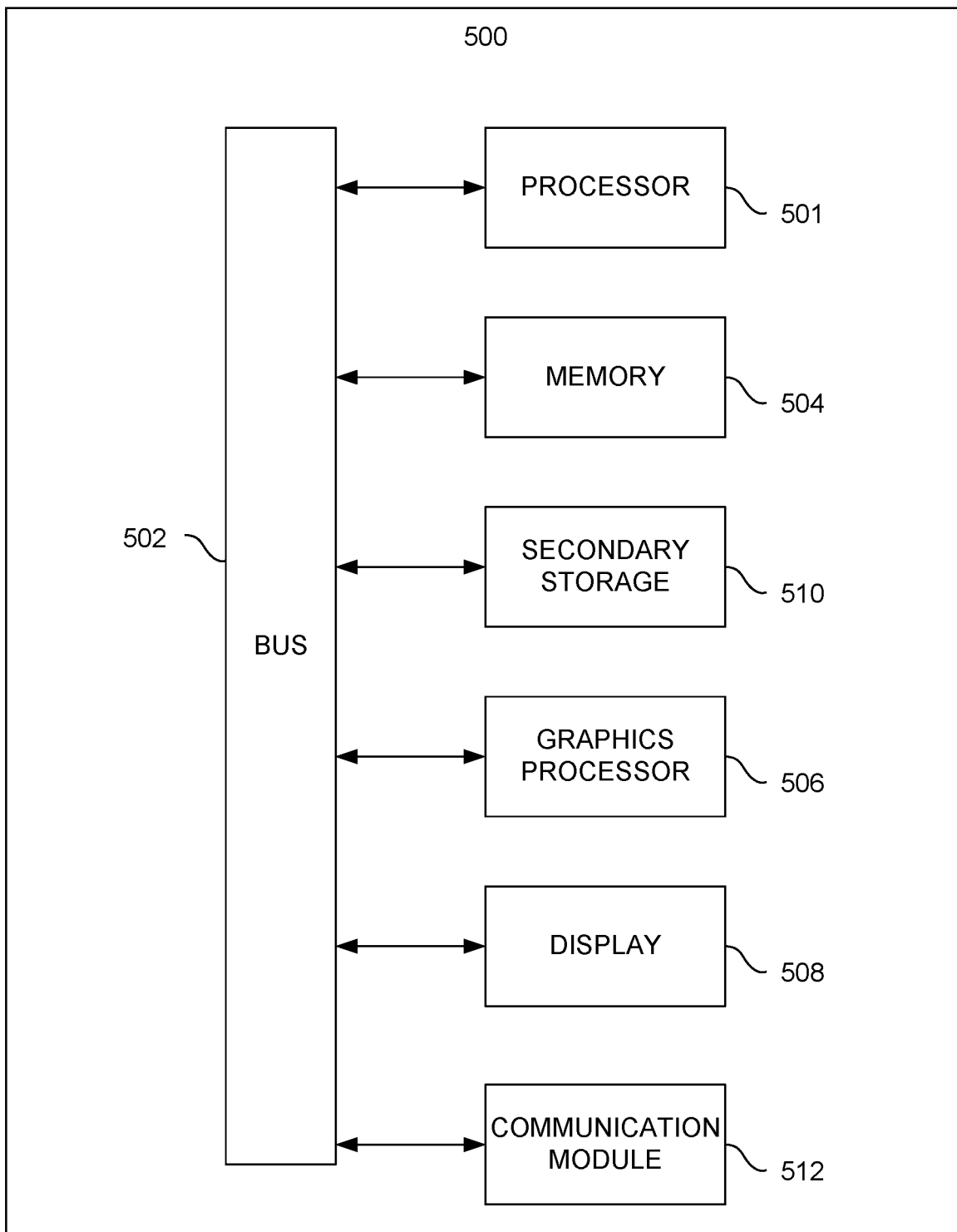
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   store in existing code defining a software application a customization to a first portion of the existing code, wherein the customization represents a customized version of the software application;
   tag the customization in the existing code with a first label that differentiates the customization from the first portion of the existing code; and
   execute the customized version of the software application by one of:
   (a) during runtime using the first label to make a logical selection of the customization for execution, wherein the logical selection of the customization prevents execution of the first portion of the existing code, or
   (b) during compile time using the first label to make the logical selection of the customization for compiling the customized version of the software application without the first portion of the existing code, and during runtime executing the compiled customized version of the software application.

2. The non-transitory computer-readable media of claim 1, wherein the existing code is base code for the software application.

3. The non-transitory computer-readable media of claim 1, wherein the existing code is an existing customization of the software application.

4. The non-transitory computer-readable media of claim 1, wherein the first portion of the existing code is tagged with a second label that is different from the first label.

5. The non-transitory computer-readable media of claim 4, wherein the second label identifies a version of the software application corresponding to the existing code.

6. The non-transitory computer-readable media of claim 5, wherein the first label identifies the customized version of the software application.

7. The non-transitory computer-readable media of claim 1, wherein the first portion of the existing code is configured according to a first standard and the customization is configured according to a second standard different from the first standard.

8. The non-transitory computer-readable media of claim 7, wherein a verification of the software application in accordance with the second standard is performed using the first label.

9. The non-transitory computer-readable media of claim 8, wherein only the customization having the first label is verified according to the second standard.

10. The non-transitory computer-readable media of claim 1, wherein after the customization is stored in the existing code defining the software application, the first portion of the existing code and the customization to the first portion of the existing code co-exist in the existing code defining the software application.

11. The non-transitory computer-readable media of claim 10, wherein execution of the first portion of the existing code is skipped during execution the customized version of the software application.

12. The non-transitory computer-readable media of claim 1, wherein the first label is a logical name of the customized version of the software application.

13. A method, comprising:
   at a computer system:
   storing in existing code defining a software application a customization to a first portion of the existing code, wherein the customization represents a customized version of the software application;
   tagging the customization in the existing code with a first label that differentiates the customization from the first portion of the existing code; and
   executing the customized version of the software application by one of:
   (a) during runtime using the first label to make a logical selection of the customization for execution, wherein the logical selection of the customization prevents execution of the first portion of the existing code, or
   (b) during compile time using the first label to make the logical selection of the customization for compiling the customized version of the software application without the first portion of the existing code, and during runtime executing the compiled customized version of the software application.

14. A system, comprising:
   a non-transitory memory storing instructions; and
   one or more processors in communication with the non-transitory memory that execute the instructions to:
   store in existing code defining a software application a customization to a first portion of the existing code, wherein the customization represents a customized version of the software application;
   tag the customization in the existing code with a first label that differentiates the customization from the first portion of the existing code; and
   execute the customized version of the software application by one of:
   (a) during runtime using the first label to make a logical selection of the customization for execution, wherein the logical selection of the customization prevents execution of the first portion of the existing code, or (b) during compile time using the first label to make the logical selection of the customization for compiling the customized version of the software application without the first portion of the existing code, and during runtime executing the compiled customized version of the software application.

\* \* \* \* \*